United States Patent [19]

Morris et al.

[11] Patent Number: 4,521,824

[45] Date of Patent: Jun. 4, 1985

[54] INTERRUPTER MECHANISM FOR A GROUND FAULT CIRCUIT INTERRUPTER

[75] Inventors: Robert A. Morris; George W. Kiesel, both of Burlington; Paul T. Rajotte, Plainville, all of Conn.

[73] Assignee: General Electric Company, New York, N.Y.

[21] Appl. No.: 579,627

[22] Filed: Feb. 13, 1984

[51] Int. Cl.[3] .......... H02H 3/347

[52] U.S. Cl. .......... 361/45; 361/115; 361/332; 361/394; 361/395; 335/18

[58] Field of Search .......... 361/44, 45, 46, 42, 361/332, 115, 392, 394, 395; 335/18, 192

[56] References Cited

U.S. PATENT DOCUMENTS

| | | | |
|---|---|---|---|
| 4,002,951 | 1/1977 | Halbeck | 361/45 |
| 4,010,431 | 3/1977 | Virani et al. | 361/45 X |
| 4,010,432 | 3/1977 | Klein et al. | 361/45 X |
| 4,013,929 | 3/1977 | Dietz et al. | 361/42 X |
| 4,233,640 | 11/1980 | Klein et al. | 361/44 |
| 4,263,637 | 4/1981 | Draper | 361/45 |
| 4,412,193 | 10/1983 | Bienwald et al. | 361/42 X |

*Primary Examiner*—Patrick R. Salce

*Attorney, Agent, or Firm*—Richard A. Menelly; Walter C. Bernkopf; Fred Jacob

[57] ABSTRACT

A compact operating mechanism for a ground fault circuit interrupter comprises a pair of main and reset slotted latches arranged under a crossarm and over a latch plate on a spring-loaded latch pin. The mechanism is reset by interference between a neck portion on the latch pin and a surface on the reset latch. The mechanism is latched by interference between the surfaces on a pair of upright posts on the latch plate and a surface on the main latch.

19 Claims, 10 Drawing Figures

PRIOR ART

PRIOR ART 102
99
100
98
97
120
91
64
63
91
96
101
121
95
94
92
93
92
93
95
94
110
103
90
89
125
108
62
109
111
107
106
160
124
118
104
103
72
128
123
71
127
119
129
115
117
116
57
158
60
156
112
157
122
131
55
61
56
88
87
130
56
155
59
58
74
73

INTERRUPTER MECHANISM FOR A GROUND FAULT CIRCUIT INTERRUPTER

BACKGROUND OF THE INVENTION

Ground fault circuit interrupting (GFCI) devices, as currently available, are capable of interrupting fault current in the range of 4 to 6 milliamps. Circuits for such devices are described in U.S. Pat. Nos. 4,345,289 and 4,348,708, both of which are in the name of Edward K. Howell. The circuits described therein basically include a current sensor or magnetics, a signal processor or electronics and an electronic switch. The magnetics consist of a differential current transformer which responds to a current imbalance in the line and neutral conductors of the distribution circuit. This current imbalance is amplified by the signal processor pursuant to triggering the electronic switch and thereby complete an energization circuit for the trip solenoid. The current sensor also includes a neutral excitation transformer for responding to a ground fault on the neutral conductor.

A mounting arrangement for the GFCI device is described in U.S. Pat. Nos. 3,950,677 and 4,001,652 to Keith W. Klein et al. In the Klein et al GFCI device, the signal processor electronics is carried on a printed wire board and is positionally mounted and retained in one shell compartment of a GFCI receptacle casing. The magnetics are positionally mounted in another shell compartment within the receptacle and are locked in place by the insertion of single turn transformer winding elements. This GFCI assembly, although compact, does not readily lend to a fully automated assembly process since the magnetics contain two separate transformers which require electrical interconnection with each other as well as with the circuit electronics. To date, the electrical interconnection of the magnetics with the electronics has accounted for a good percentage of the time involved in the GFCI assembly process.

The operating mechanism for the Klein et al GFCI device is described within U.S. Pat. No. 4,010,432, also in the name of Keith W. Klein et al. This patent shows the arrangement between the latch and trip solenoid for tripping the device and deenergizing the receptacle sockets. Reference should be made to this patent for a detailed explanation of the state of the art of GFCI operating mechanisms as illustrated therein.

The purpose of this invention is to provide a compact operating mechanism which allows the interrupter contacts to be reset and latched upon depression of the reset button. The preassembly of a compact operating mechanism unit allows the unit to be robotically assembled within the GFCI case and fastened by means of a single retainer screw.

SUMMARY OF THE INVENTION

A GFCI device is adapted for completely automated assembly by a preassembled compact operating mechanism unit consisting of a pair of main and reset latches mounted on a spring loaded latch pin between a crossarm and latch plate assembly. The reset latch engages with a neck or groove portion on the latch pin when the reset button is depressed. This allows the main latch to engage with latching surfaces on the latch plate and to hold the crossarm against the bias of the reset spring. A pair of spring-loaded moveable contact arms force the moveable contacts into engagement with corresponding fixed contacts by contact with the crossarm. A pivotally mounted trip lever operatably coupled with the armature of the trip solenoid engages both the main and reset latches to move the latches out of interference with the latch plate and latch pin surfaces. The crossarm rapidly moves away from the moveable contact arms under the return bias of the spring loaded contact arms. The moveable contacts correspondingly move out of engagement with the fixed contacts by means of the return bias provided by the same contact arms.

GENERAL DESCRIPTION OF THE INVENTION

Figure 1:
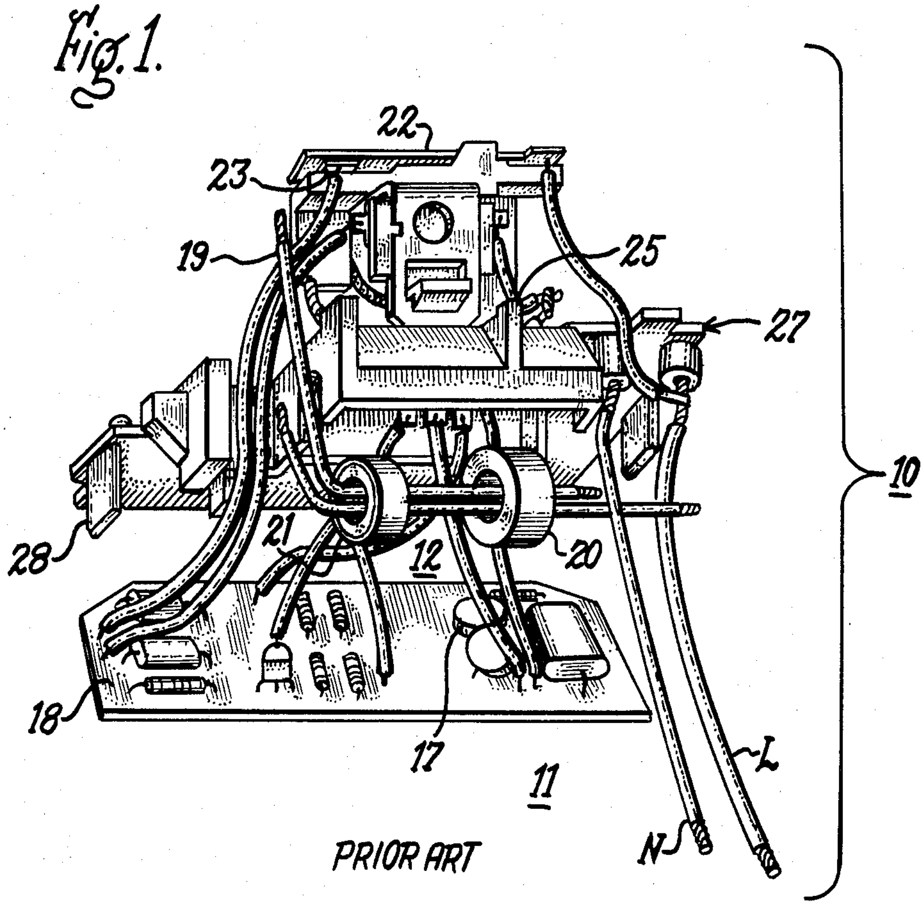
FIG. 1 is a front perspective view of a GFCI assembly according to the prior art.
Figure 2:
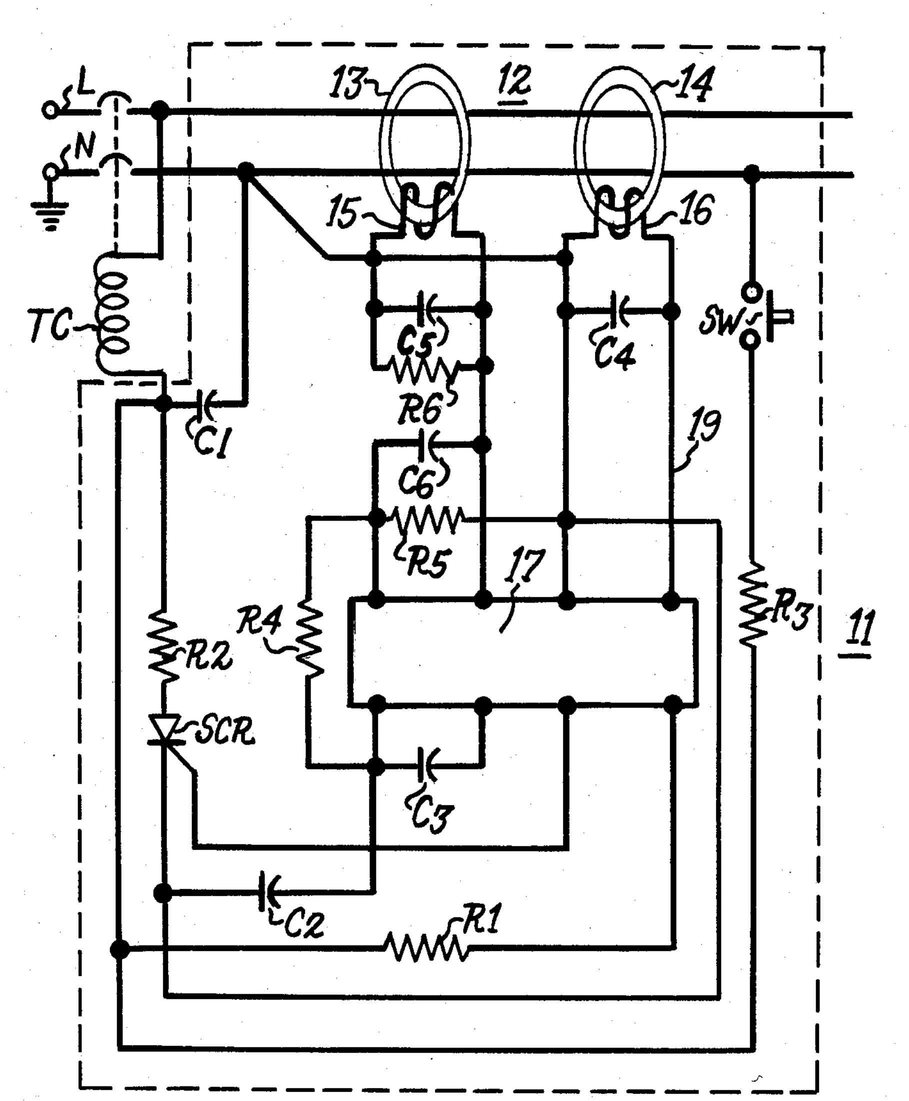
FIG. 2 is an electrical schematic of the signal processor electronics used within the GFCI of FIG. 1.

The electrical interconnect arrangement for allowing plug-in of a magnetic sensor module within an automated GFCI device can be better understood by referring first to the state of the art GFCI device 10 depicted in FIG. 1 and the electronics module 11 depicted in FIG. 2. The electronics module is described in detail in the aforementioned patents to Howell which are incorporated herein for purposes of reference. The magnetics 12 consists of a differential current transformer core 13 and a neutral transformer core 14 for encircling the line and neutral conductors L, N. The differential transformer secondary winding 15 and the neutral excitation transformer secondary winding 16 interconnect with an amplifier chip 17 for amplifying the ground fault currents detected and for operating an SCR and trip coil solenoid TC to open the switch contacts. A plurality of discrete circuit elements such as capacitors $C_1$–$C_6$ and resistors such as $R_1$–$R_6$ are required for current limitation and noise suppression. A test switch SW is used for directly connecting the trip coil solenoid through a current limiting resistor, such as $R_3$, whereby the circuit between the line and neutral conductors is complete and the switch contacts are opened to test the circuit.

The arrangement of the electronics module 11 within the prior art GFCI device 10 is provided by means of a printed wire board 18 which carries the discrete elements such as the resistors, capacitors, SCR and the amplifier chip 17. The electronics module 11 is interconnected with the magnetics 12 by means of a plurality of wires generally indicated as 19. The magnetics consisting of differential current transformer 21, containing core 13 and winding 15, and neutral excitation transformer 20 containing core 14 and winding 16, are secured to the underside of a mounting platform 27. The line and neutral conductors L, N connect with the magnetics 12, electronics module 11 and with the switch SW consisting of movable and fixed contacts 22, 23 supported on the mounting platform 27 by means of a pedestal 25. The TC solenoid is mounted subjacent the movable and fixed contacts 22, 23 and operates to open the contacts upon the occurrence of ground fault current through either or both of the transformers. Four posts 28 depending from the bottom of the mounting platform 27 provide requisite clearance between the mounting platform and the bottom case (not shown) of the device for the printed wire board 18.

Figure 3:
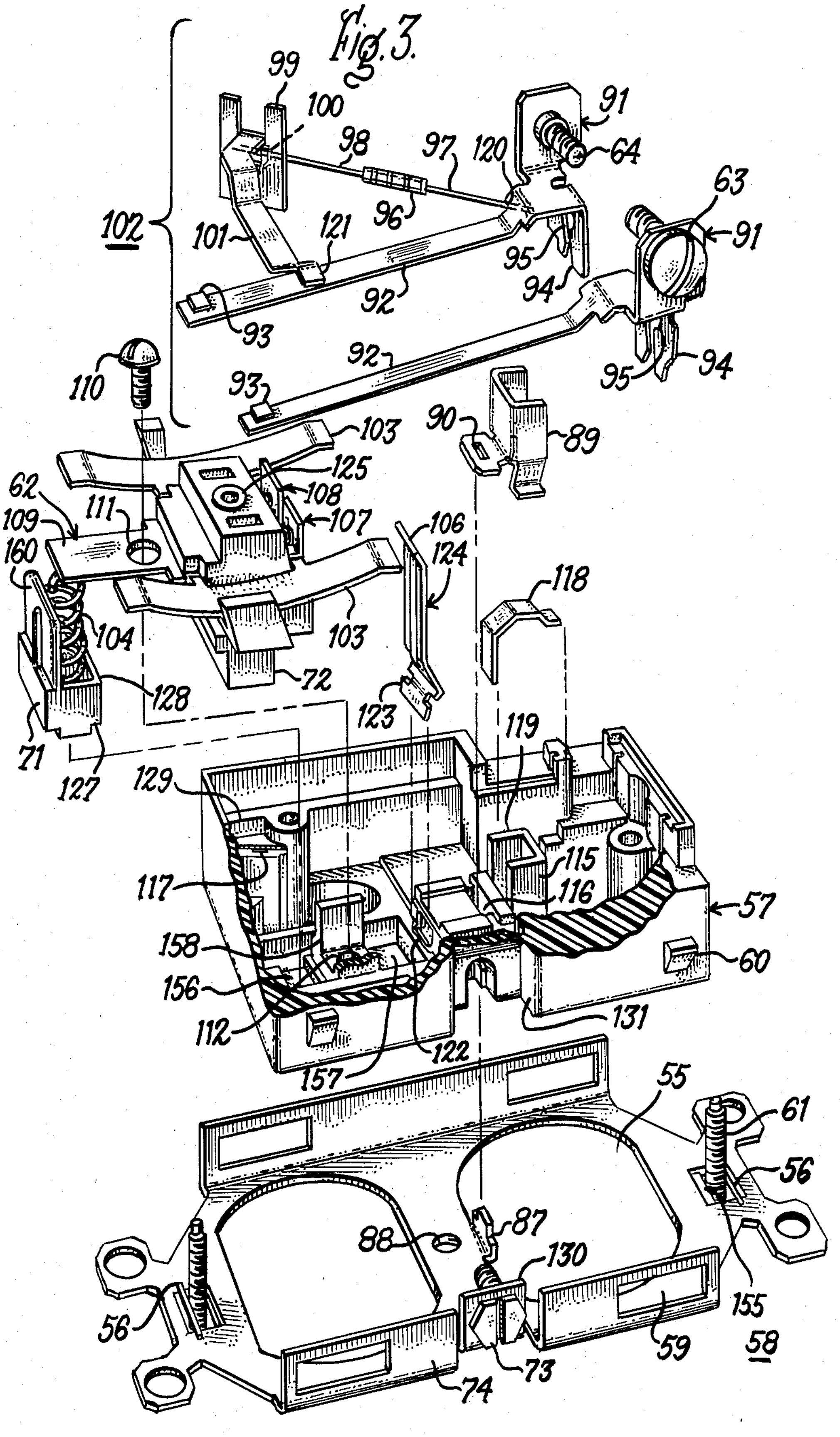
FIG. 3 is an exploded top perspective view of the push-to-test assembly and operating mechanism assembly prior to insertion within the GFCI case.

By arranging a pair of moveable contact arms 92 proximate a corresponding pair of contact arm springs under the control of a compact operating mechanism assembly as depicted in FIG. 3, all the components of the GFCI device can be downloaded within the case in a completely automated process.

DESCRIPTION OF THE PREFERRED EMBODIMENT

The operating mechanism assembly 62 is shown in FIG. 3 under the push-to-test assembly 102. The push-to-test assembly consisting of a pair of receptacle stab and contact units 91 wherein the receptacle stab 94 is integrally formed with the moveable contact arm 92 and supports the load neutral terminal screw 63 on one unit and the load line terminal screw 64 on another unit is fully described in U.S. patent application (Ser. No. 579,626, filed Feb. 13, 1984), which application is incorporated herein for purposes of reference. As described within the aforementioned application, testing is achieved by means of a push-to-test conductive strap 101 and current limiting resistor 96, which is connected to the strap by means of a lanced tab 100 on a contact plate 99. To provide good electrical connection between the resistor lead 97 and the angled portion 120 of receptacle stab 94, a spring clip 118 is arranged within the GFCI case 57. The ground contact stab 89, which cooperates with the ground stake tab 87 on the GFCI yoke 58 and the ground stake slot 90, is also described in the aforementioned application and reference should be made thereto for a better understanding of both the push-to-test and integral grounding arrangement of the GFCI device.

The operating mechanism assembly 62 includes a pair of contact springs 103 subjacent the moveable contact arms 92 and on either side of the mechanism crossarm 105. A main latch 107 and reset latch 108 are carried by the crossarm along with the latch plate 109. The operating mechanism assembly is secured to the GFCI case 57 by means of a screw 110 which is inserted through the screw hole 111 in the latch plate and threadingly engaged with the screw hole 112 in the case. A crossarm latch pin 125 is attached to the reset button 72 and is located between a pair of latch clearance slots 140. The test button 71 with stops 127, 128, is biased against the latch plate 109 by means of the reset spring 104 as fully described in the aforementioned application and forms no part of the instant invention. A trip lever 124 having a trip solenoid contact end 106 and a pivot end 123 is inserted within a trip lever cavity 122 within the case. When the operating mechanism assembly 62 is mounted within the case, the latch plate 109 sits between a pair of support posts 132 and the reset button 72 and test button 71 project through the reset button and test button openings 157, 156 respectively.

Figure 4:
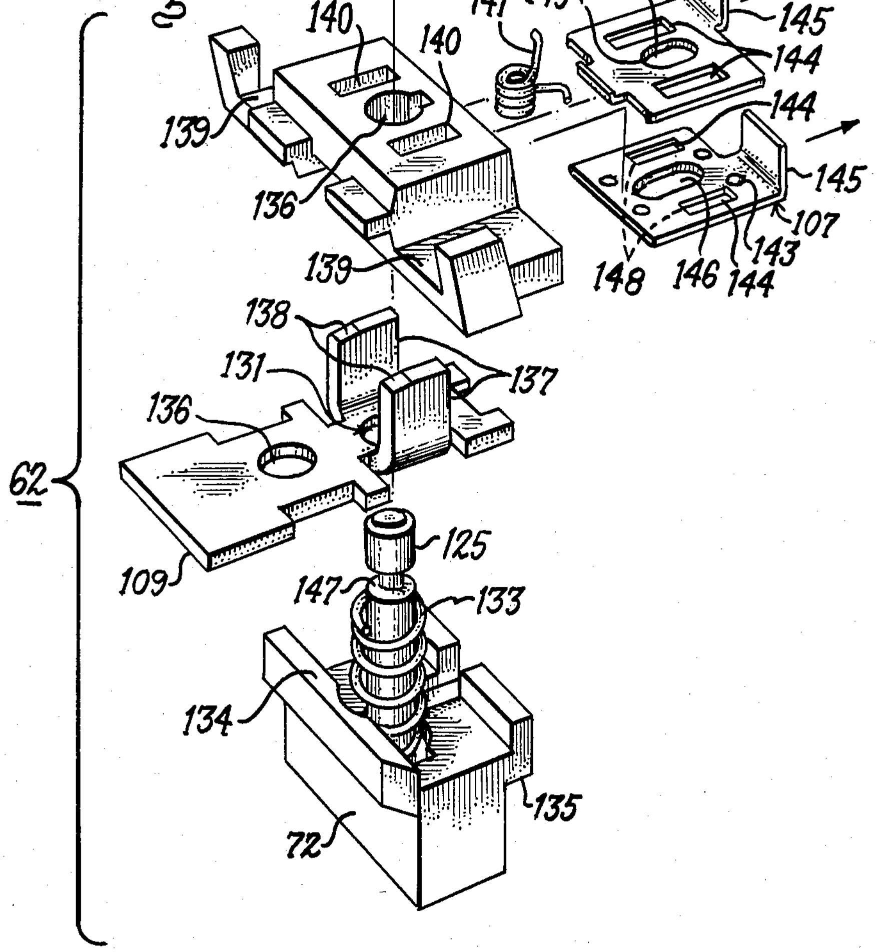
FIG. 4 is an exploded top perspective view of the operating mechanism depicted in FIG. 3 in accordance with the invention

The operation of the operating mechanism assembly 62 can be seen by referring to FIGS. 4 through 6 as follows. The reset button 72 is provided with a trip position stop 135 on one side which contacts a portion of the GFCI case when the button is in a tripped position and a stop 134 on an opposite side for locating the button when in a reset position. A latch pin 125 having a neck portion 147 which serves as a reset latch retainer slot, is surrounded by a reset button return spring 133. The latch pin 125 extends through a clearance hole 136 through latch plate 109. The latch plate carries a pair of latch posts 137, each of which has a latching surface 138 for interacting with a corresponding latch surface 148 on a main latch 107 in a manner to be described in detail below. The main latch 107 contains a latch pin clearance slot 146 through which the latch pin extends and a trip lever contact tab 145 for operative engagement with a solenoid plunger rod tip 151. Four projections 143 on the main latch serve to space the main latch from a reset latch 108 which contains a reset surface 149 for engaging the neck portion 147 on the latch pin 125 in a manner to be discussed below. A pair of latch post clearance slots 144 are provided in both the main latch 107 and reset latch 108 for allowing the latch posts to move freely through both latches. The mechanism crossarm 105 is provided with a latch pin clearance hole 136 through which the latch pin extends and a pair of latch post clearance slots 140 for allowing the crossarm to slide along the latch posts when the trip button is depressed and released. A pair of supports 139 are provided on each side of the crossarm to support the contact springs 103 shown earlier in FIG. 3. A latch reset spring 141 is retained within a recess 142 formed within the crossarm and biases both latches in the indicated direction.

Figure 5:
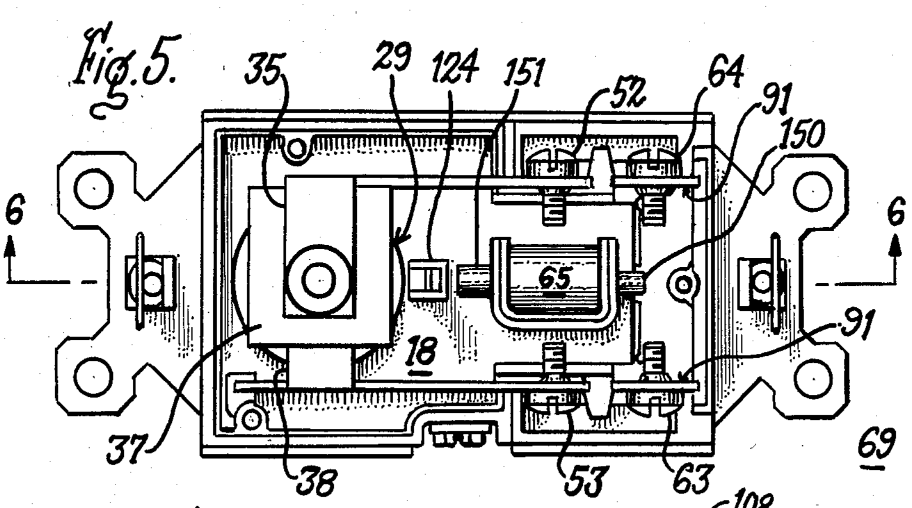
FIG. 5 is a plan view of a completely assembled GFCI device.

A completed GFCI device 69 is shown in FIG. 5 with the printed wire board 18 inserted over the operating mechanism assembly. The printed wire board carries the magnetic sensor module plug-in subassembly 29 which is fully described in U.S. patent application (Ser. No. 579,336, filed Feb. 14, 1984), which application is incorporated herein for purposes of reference. Also carried on the printed wire board is the trip solenoid 65 along with the solenoid plunger 150 and the solenoid plunger rod tip 151. The trip lever 124 projects through the printed wire board in close proximity to the plunger rod tip. The line line terminal screw 52 and line neutral terminal screw 53 are carried by the printed wire board and the load neutral terminal screw 63 and load line terminal screw 64 are carried by the receptacle stab and contact units 91 which were described earlier with reference to FIG. 3.

Figure 6A:
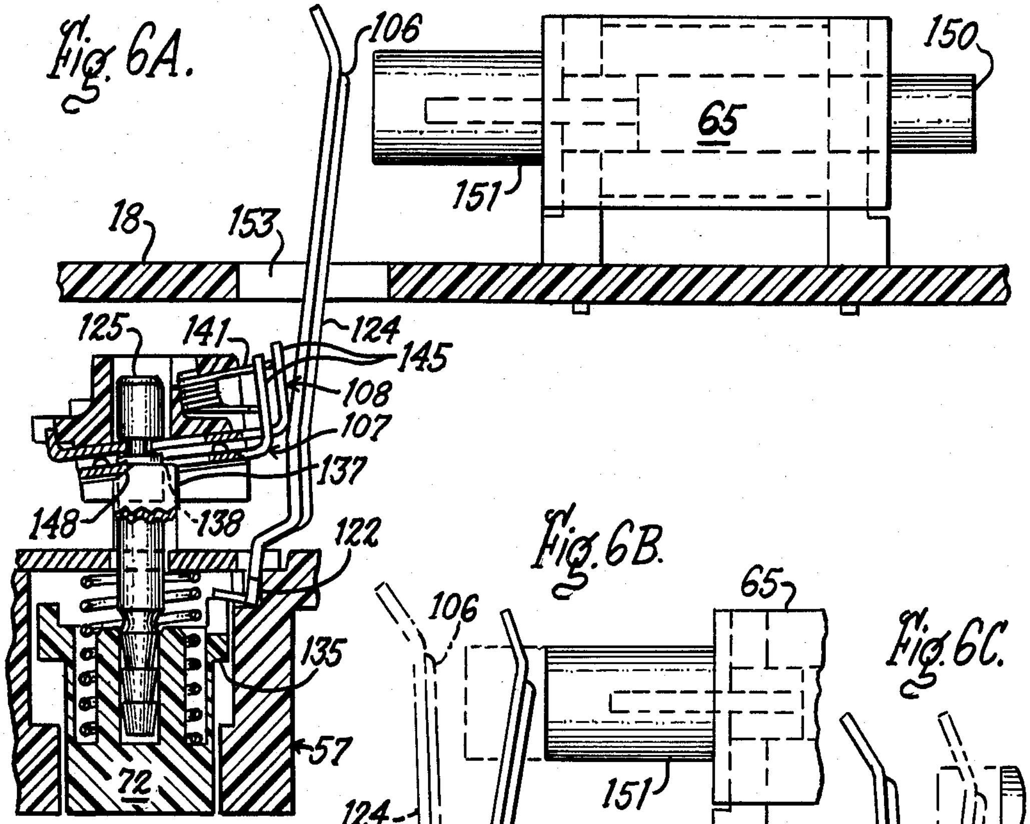
FIGS. 6A–6C are enlarged side views in partial section of the operating mechanism and trip solenoid depicted within device of FIG. 5.

The operating mechanism assembly 62 is shown in a latched condition in FIG. 6A. The trip solenoid 65 mounted on the printed wire board 18 along with a solenoid plunger 150 and plunger rod tip 151 are located proximate the solenoid contact end 106 of the trip lever 124 which extends through the trip lever clearance hole 153. A reset button 72 is fully depressed within case 57 and the reset button return spring 133 is fully compressed against the latch plate 109. In this condition, the latch pin 125 extends through the clearance slot 144 in the reset latch 108 such that the neck portion 147 of the latch pin engages a corner of the clearance slot, thereby preventing the latch pin from returning under the force of the reset button return spring 133. The latch post surface 138 contacts the main latch surface 148 of the main latch 107. The latch reset spring 141 is engaged with the trip lever contact tabs on both the main and reset latches 107, 108 and assists in maintaining both latches in the "latched" or "on" position. As described earlier, the crossarm 105 in this position maintains the moveable contact arms 92 and the associated moveable contacts 93 in a closed position with respect to the fixed contacts.

Figure 6B:
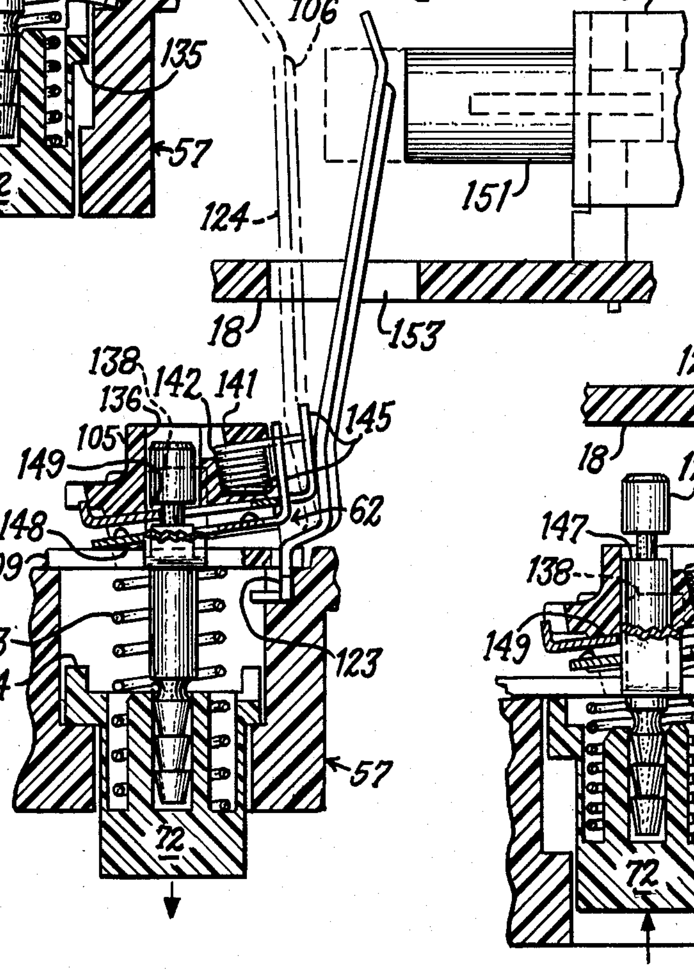

The tripped condition of the operating mechanism assembly 62 is shown in FIG. 6B with the solenoid contact end 106 of the trip lever 124 moved to the position indicated in phantom causing the trip lever to contact a trip lever contact tab 145 on the main latch 107 disengaging the latch post surface 138, and a trip lever contact tab 145 on the reset latch 108. The reset latch surface 149 on the reset latch moves out from contact with the neck portion 147 of the latch pin 125, allowing the latch pin 125 to move the reset button 72 and crossarm 105 in the indicated direction. The trip lever immediately returns to the initial position upon the return bias of spring 141. As described earlier with reference to the aforementioned U.S. patent application, the movement of the crossarm 105 and the moveable contact arms 92 moves the moveable contacts 93 out of engagement with the fixed contacts. The moveable contact arms 92 are fabricated from a spring brass composition and are tempered to perform as a pair of spring-loaded cantilevers biased away from the fixed contacts, i.e., in the open position. The contact springs 103 are situated intermediate the crossarm 105 and the contact arms 92 to provide contact pressure to the moveable contacts.

Figure 6C:
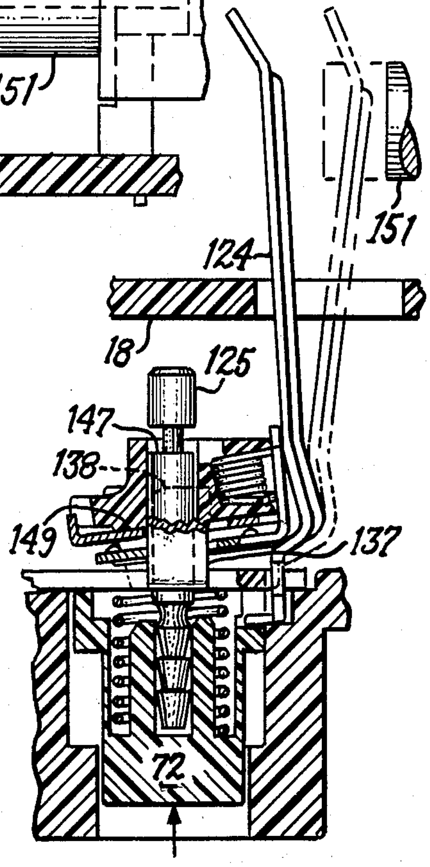

In order to insure high speed ground fault protection after a ground fault tripping operation has occurred and while attempting to reset the device back to the latched position depicted in FIG. 6A, the trip-free condition shown in FIG. 6C is required. This condition allows the contacts to open independent of the position of the reset button by the disengagement between the reset latch surface 149 on reset latch 108 and the neck portion 147 of the latch pin 125 in the event that the ground fault condition still exists. To return to the latched condition, the reset button and latch pin must both return to the tripped position shown in FIG. 6B. For this to occur, the reset latch surface on the reset latch must re-engage the neck portion on the latch pin. Therefore, it is only possible to relatch the device in the absence of any ground fault, that is, with the plunger rod tip 151 out of contact with both the main and reset latch tabs 145.

Figure 7:
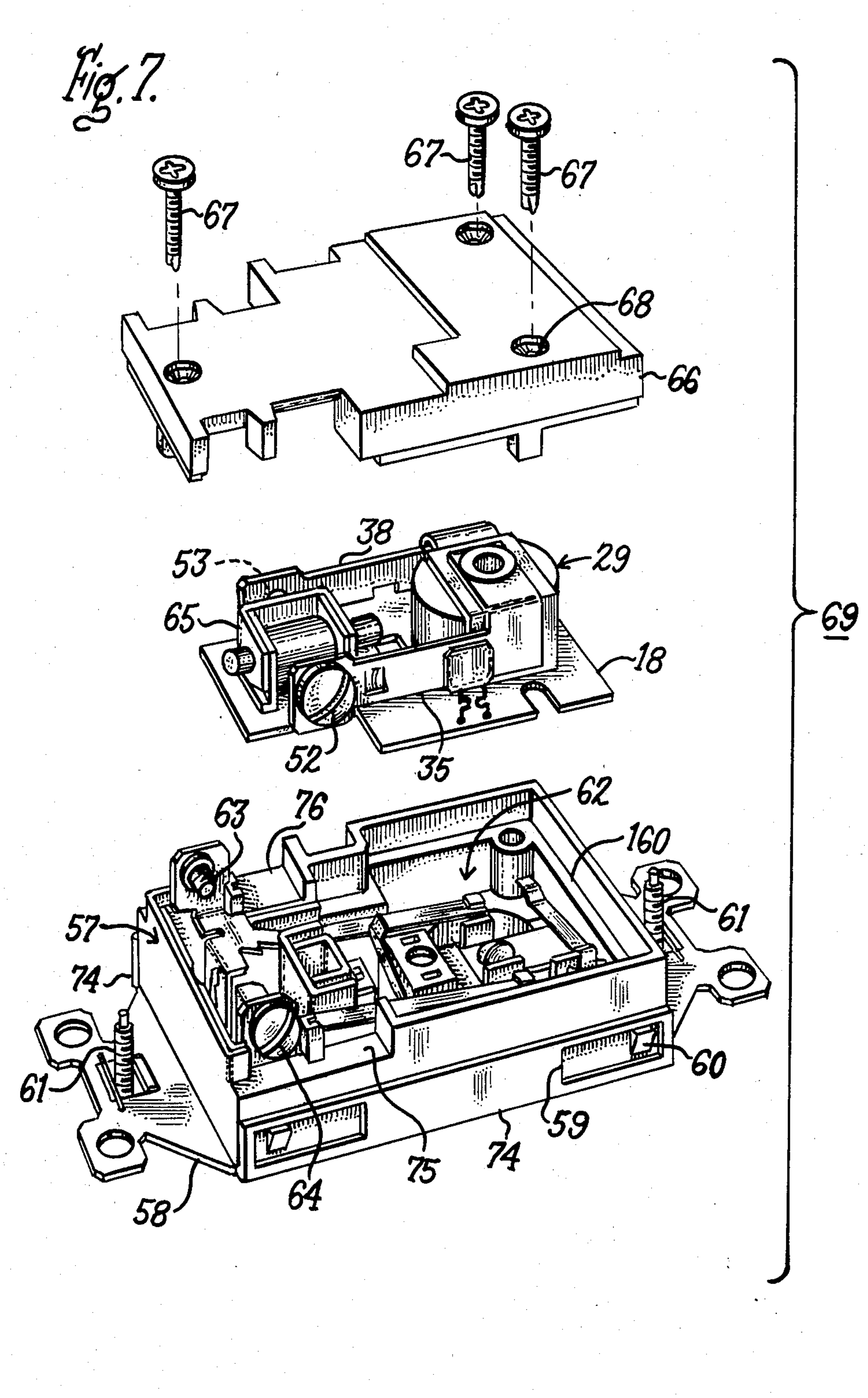
FIG. 7 is an exploded top perspective view of the GFCI components pior to assembly.

The operating mechanism assembly 62 is shown within the GFCI case 74 in FIG. 7, along with the receptacle stab and contact units 91 and the load line and load neutral terminal screws 64, 63. Prior to mounting the mechanism assembly within the case, yoke 58 is attached to the case by fitting slots 59 which are formed within the yoke side rails 74 over corresponding projections 60 formed in the case. Yoke 58 has mounting screws 61 for ease in attaching the GFCI device. A neutral terminal screw slot 76 and a line terminal screw slot 75 are formed on opposite sides of the case and are located such that the line line terminal screw and line neutral terminal screws 52, 53 are accessible when the printed wire board 18 and magnetic sensor module subassembly 29 are inserted within the case. The cover 66 is next fitted over the case and screws 67 are inserted through holes 68 to the case for fastening therein. It is thus seen that the attachment of the complete operating mechanism assembly 62 in a single unitary structure by means of a single screw 110 greatly facilitates the automatic assembly of the entire GFCI device.

Figure 8:
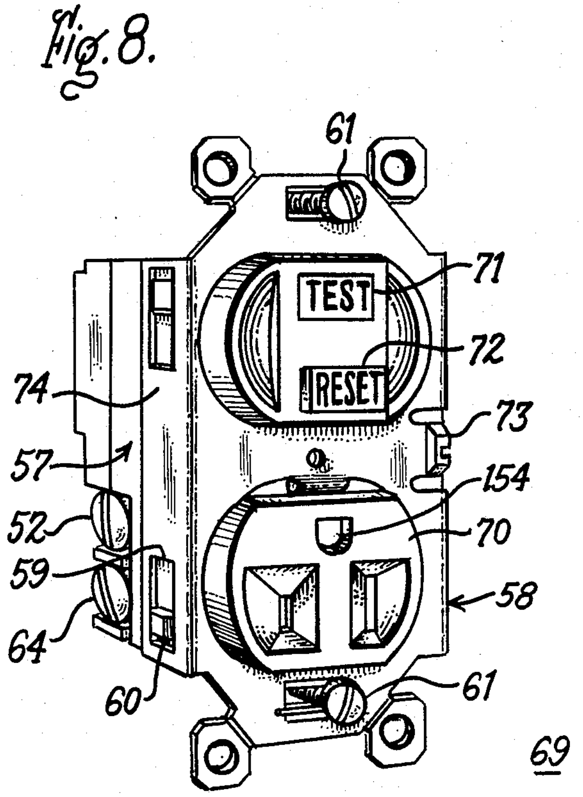
FIG. 8 is a front perspective view of the GFCI components completely assembled.

The completely assembled GFCI device 69 is shown in FIG. 8 with the test button 71 and reset button 72 arranged above a single outlet receptacle 70 which extends through the yoke 58. Both the line line terminal screw 52, load line terminal screw 64 and ground screw 73 are conveniently accessible for electrical connection.

It is thus seen that an automated assembly process for GFCI devices is made possible by positioning the magnetic sensor module subassembly within the printed wire board 18 prior to connection with the operating mechanism assembly 62 already assembled within the case 57 as depicted earlier in FIG. 6.

We claim:

1. A ground fault circuit interrupter comprising:

an apertured molded case;

a trip solenoid and signal processor circuit within said case; and a pair of fixed and moveable contacts operatively mounted proximate a trip lever and an operating mechanism, said operating mechanism causing said fixed and moveable contacts to become separated upon operation of said trip lever, said operating mechanism including a crossarm member holding said moveable contacts in electrical connection with said fixed contacts against the bias of a pair of moveable contact arms carrying said moveable contacts, said operating mechanism comprising a moveable crossarm operating member and a moveable button member interconnected by a latch pin, said crossarm including a latch pin clearance slot and a pair of latch post clearance slots, one on either side of said latch pin clearance slot.

2. The circuit interrupter of claim 1 further including a latch plate interposed between said crossarm and said button.

3. The circuit interrupter of claim 2 wherein said latch plate includes a latch pin clearance hole and a pair of upright latch posts, one on either side of said latch pin clearance hole.

4. The circuit interrupter of claim 3 wherein said latch plate is mounted on said latch pin through said latch pin clearance h.loe and said latch posts are slidably arranged within said crossarm latch post clearance slots.

5. The circuit interrupter of claim 4 further including a main latch consisting of a plate having a latch pin clearance slot and a pair of latch post slots, one on either side of said latch pin clearance slot, and an upright trip lever contact tab.

6. The circuit interrupter of claim 5 wherein said main latch is slidably mounted on said latch pin by locating said latch pin through said latch pin clearance slot and said latch posts through said latch post slots.

7. The circuit interrupter of claim 5 wherein said trip lever contact tab is biased against said trip lever by a latch spring.

8. The circuit interrupter of claim 7 wherein said latch posts contain latch engaging surfaces for engaging latching surfaces on said main latch when said crossarm is in a latched position to hold said crossarm against return bias of said moveable contact arms.

9. The circuit interrupter of claim 5 further including a reset latch consisting of a plate having a latch pin slot and a pair of latch post clearance slots, one on either side of said latch pin slot, and an upright trip lever contact tab.

10. The circuit interrupter of claim 9 wherein said reset latch is slidably mounted on said latch pin by locating said latch pin through said latch pin slot and said latch posts through said latch post clearance slots.

11. The circuit interrupter of claim 10 wherein said latch pin includes a retainer groove at one end opposite said button for engaging with a surface on said reset latch when said crossarm is in a latched position to hold said button in operative engagement with said crossarm.

12. The circuit interrupter of claim 8 wherein said main latch trip lever contact tab receives said trip lever and displaces said main latch engaging surfaces from said latch post latch engaging surfaces to allow said crossarm to return in an opposite direction along said latch pin to a tripped position and to allow said moveable contacts to separate from said fixed contacts under return bias of said moveable contact arms.

13. The circuit interrupter of claim 11 wherein said reset latch trip lever contact tab receives said trip lever and displaces said reset latch engaging surface from said latch pin retainer groove removing said button from operative engagement with said crossarm to allow said crossarm to return in an opposite direction along said latch pin to a trip free position and to allow said moveable contacts to separate from said fixed contacts under return bias of said moveable contact arms.

14. The circuit interrupter of claim 11 wherein said retainer groove on said latch pin comprises a neck portion on said pin of a lesser diameter than said pin.

15. The circuit interrupter of claim 14 wherein said trip lever contacts both said reset latch trip lever contact tab and said main latch trip lever contact tab when said crossarm is in a tripped position and holds said main latch engaging surfaces away from engagement with said latch post engaging surfaces and said reset latch engaging surfaces away from engagement with said latch pin neck portion thereby allowing said latch pin to transverse through said crossarm clearance slot without moving said crossarm.

16. The circuit interrupter of claim 9 wherein said main latch or said reset latch includes projections for allowing sliding clearance when said main and reset latches are commonly mounted on said latch pin.

17. The circuit interrupter of claim 7 wherein said latch spring is mounted within a recess formed in said crossarm.

18. The circuit interrupter of claim 9 wherein said latch spring comprises a double-ended torsion spring, one of said ends contacting said reset latch trip lever contact tab and the other of said ends contacting said main latch trip lever contact tab.

19. The circuit interrupter of claim 2 wherein said latch plate includes a clearance hole for accepting means for fastening said latch plate to said case.

* * * * *